US009612698B2

(12) United States Patent
Chen et al.

(10) Patent No.: US 9,612,698 B2
(45) Date of Patent: Apr. 4, 2017

(54) TOUCH SENSING STRUCTURE

(71) Applicant: Industrial Technology Research Institute, Hsinchu (TW)

(72) Inventors: Sin-An Chen, Changhua County (TW); Sheng-Wei Chen, Kinmen County (TW); Chih-Chia Chang, Hsinchu County (TW); Wei-Yi Lin, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 64 days.

(21) Appl. No.: 14/535,331

(22) Filed: Nov. 7, 2014

(65) Prior Publication Data

US 2015/0293646 A1 Oct. 15, 2015

(30) Foreign Application Priority Data

Apr. 10, 2014 (TW) .............................. 103113202 A

(51) Int. Cl.
*G06F 3/041* (2006.01)
*G06F 3/045* (2006.01)
*G06F 3/044* (2006.01)

(52) U.S. Cl.
CPC ............ *G06F 3/044* (2013.01); *G06F 3/0412* (2013.01); *G06F 3/0416* (2013.01); *G06F 2203/04102* (2013.01); *G06F 2203/04111* (2013.01)

(58) Field of Classification Search
CPC ....... G06F 3/044; G06F 3/0412; G06F 3/0416
See application file for complete search history.

(56) References Cited

U.S. PATENT DOCUMENTS 8,462,129 B2 6/2013 Miyayama et al.
8,599,150 B2 12/2013 Philipp
(Continued)

FOREIGN PATENT DOCUMENTS

CN 1654964 8/2005
CN 102194540 9/2011
(Continued)

OTHER PUBLICATIONS

"Office Action of Taiwan Counterpart Application", issued on May 26, 2015, p. 1-p. 10.
(Continued)

*Primary Examiner* — Marvin Payen
*Assistant Examiner* — Jeremy Joy
(74) *Attorney, Agent, or Firm* — Jianq Chyun IP Office

(57) ABSTRACT

A touch sensing structure including a plastic substrate, a buffer layer, an electrode layer, an insulation unit, and a passivation layer is provided. The buffer layer is disposed on the plastic substrate, and the electrode layer includes a first patterned transparent electrode layer and a second patterned transparent electrode layer. The first patterned transparent electrode layer is disposed on the buffer layer, and the second patterned transparent electrode layer is disposed on the buffer layer. The insulation unit insulates the first patterned transparent electrode layer and the second patterned transparent electrode layer, and the passivation layer is disposed on the electrode layer. Twice a total optical path length of the electrode layer and the passivation layer along a direction substantially parallel to a normal direction of the plastic substrate ranges from 1000 nm to 2500 nm.

18 Claims, 7 Drawing Sheets

(56) References Cited

U.S. PATENT DOCUMENTS

| | | | | |
|---|---|---|---|---|
| 2010/0214247 | A1* | 8/2010 | Tang | H03K 17/98 345/173 |
| 2010/0245269 | A1* | 9/2010 | Jeong | G06F 3/044 345/173 |
| 2010/0265206 | A1* | 10/2010 | Chen | G06F 3/0412 345/174 |
| 2010/0265207 | A1* | 10/2010 | Chen | G06F 3/0412 345/174 |
| 2011/0279403 | A1* | 11/2011 | Lee | G06F 3/044 345/174 |
| 2012/0007827 | A1* | 1/2012 | Lin | G06F 3/044 345/174 |
| 2012/0033168 | A1* | 2/2012 | Hwang | G02F 1/13338 349/139 |
| 2012/0038595 | A1* | 2/2012 | Park | G06F 3/044 345/176 |
| 2012/0249465 | A1* | 10/2012 | Lin | G06F 3/041 345/173 |
| 2013/0002569 | A1* | 1/2013 | Kang | G06F 3/044 345/173 |
| 2013/0043068 | A1* | 2/2013 | Xie | G06F 3/044 174/262 |
| 2013/0135241 | A1 | 5/2013 | Wu et al. | |
| 2013/0141380 | A1* | 6/2013 | Wang | G06F 3/041 345/173 |
| 2013/0236672 | A1 | 9/2013 | Kim et al. | |
| 2014/0168099 | A1* | 6/2014 | Lee | G06F 1/1643 345/173 |
| 2014/0174789 | A1* | 6/2014 | Jiang | G06F 3/044 174/250 |
| 2014/0253830 | A1* | 9/2014 | Li | G06F 1/1637 349/12 |

FOREIGN PATENT DOCUMENTS

| | | |
|---|---|---|
| CN | 102214498 | 10/2011 |
| CN | 202795320 | 3/2013 |
| CN | 202887770 | 4/2013 |
| TW | 201331801 | 8/2013 |
| TW | M462407 | 9/2013 |
| TW | 201344316 | 11/2013 |
| TW | M464966 | 11/2013 |
| TW | 201403419 | 1/2014 |

OTHER PUBLICATIONS

Guillen et al., "Comparison study of ITO thin films deposited by sputtering at room temperature onto polymer and glass substrates," Thin Solid Films, Jun. 1, 2005, pp. 129-132.

R. A. Synowicki, "Spectroscopic ellipsometry characterization of indium tin oxide film microstructure and optical constants," Thin Solid Films, Feb. 13, 1998, pp. 394-397.

Kang et al., "Optical Properties of Sputtered Indium-tin-oxide Thin Films," Journal of the Korean Physical Society, Nov. 2011, pp. 3280-3283.

Ito et al., "Electrical and optical properties of amorphous indium zinc oxide films," Thin Solid Films, Feb. 1, 2006, pp. 99-103.

Granqvist et al., "Transparent and conducting ITO films: new developments and applications," Thin Solid Films, May 22, 2002, pp. 1-5.

Minami et al., "Physics of very thin ITO conducting films with high transparency prepared by DC magnetron sputtering," Thin Solid Films, Dec. 1, 1995, pp. 37-42.

\* cited by examiner

TOUCH SENSING STRUCTURE

CROSS-REFERENCE TO RELATED APPLICATION

This application claims the priority benefit of Taiwan application serial no. 103113202, filed on Apr. 10, 2014. The entirety of the above-mentioned patent application is hereby incorporated by reference herein and made a part of this specification.

TECHNICAL FIELD

The technical field relates to a sensing structure, and relates to a touch sensing structure.

BACKGROUND

Along with development of electronic component technology and human-machine interface, mouse, keyboard or button-type user interface are unable to satisfy user's demand. Regarding a mobile computing device, the mouse, keyboard and buttons are not convenient operation interfaces, which occupy a certain space outside a screen, such that a volume of the mobile computing device is hard to be reduced.

In this case, a touch panel technique is quickly developed. A touch panel is generally disposed in front of a screen, such that a user may have a feeling of operating objects displayed on the screen. Based on such intuitive operation method, even elders or children who are not accustomed to use a mouse and keyboard can learn to use the touch panel quickly, and therefore the touch panel is widely welcomed by consumers.

The existing touch panels may include capacitive touch panels, resistive touch panels, optical touch panels, etc. according to different operation principles thereof, where the capacitive touch panels are widely applied in mobile computing devices due to its high sensitivity.

However, human pursuit of technology product is endless, and in a next generation, flexible touch screens are probably welcomed by consumers. In order to match a flexible display, the touch panel should also be made flexible, and a glass substrate in the touch panel is required to be changed to a flexible substrate, for example, a plastic substrate. However, the plastic substrate is liable to be yellowed under high temperature of the fabrication process, which may result in a yellowing phenomenon of the whole flexible touch sensor, and decrease a color performance of the flexible touch screen.

SUMMARY

An embodiment of the disclosure provides a touch sensing structure including a plastic substrate, a buffer layer, an electrode layer, an insulation unit, and a passivation layer. The buffer layer is disposed on the plastic substrate, and the electrode layer includes a first patterned transparent electrode layer and a second patterned transparent electrode layer. The first patterned transparent electrode layer is disposed on the buffer layer, and the second patterned transparent electrode layer is disposed on the buffer layer. The insulation unit insulates the first patterned transparent electrode layer and the second patterned transparent electrode layer, and the passivation layer is disposed on the electrode layer. For example, the passivation layer is disposed on the first patterned transparent electrode layer or the second patterned transparent electrode layer, or on both of the first patterned transparent electrode layer and the second patterned transparent electrode layer. Twice a total optical path length of the electrode layer and the passivation layer along a direction substantially parallel to a normal direction of the plastic substrate ranges from 1000 nm to 2500 nm.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1A:
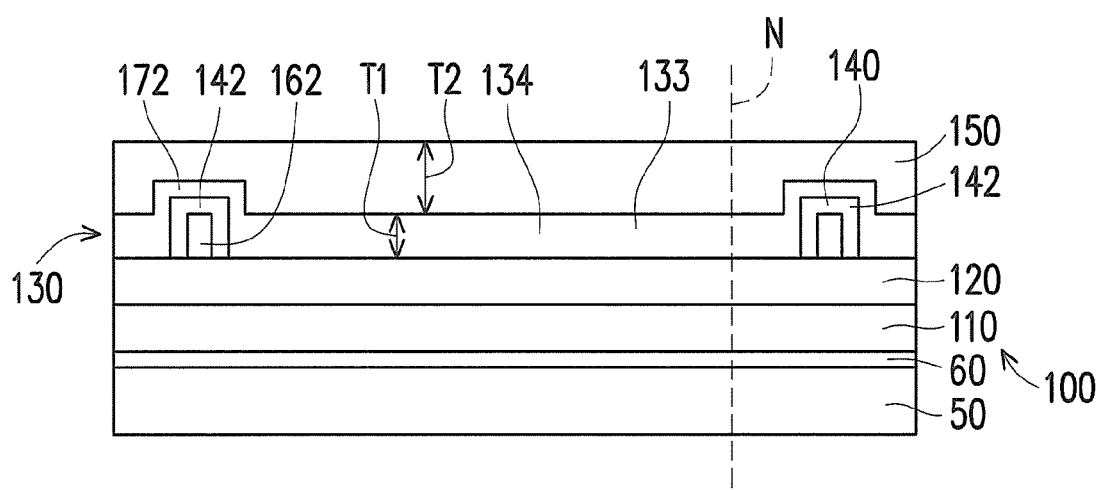
FIG. 1A is a cross-sectional view of a touch sensing structure according to an embodiment of the disclosure.
Figure 1B:
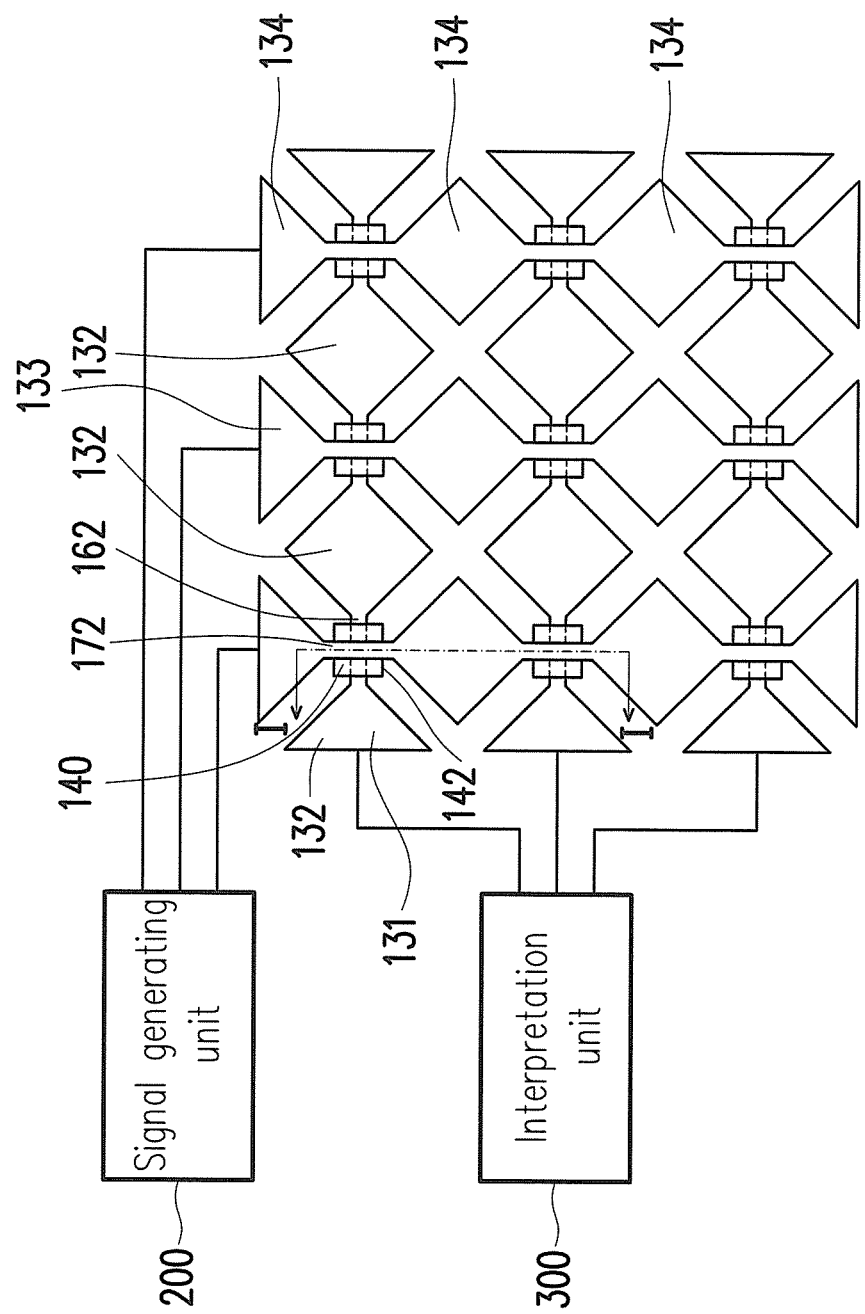
FIG. 1B is a top view of an electrode layer, an insulation unit, first conductive connection segments and second conductive connection segments of the touch sensing structure of FIG. 1A.
Figure 1C:
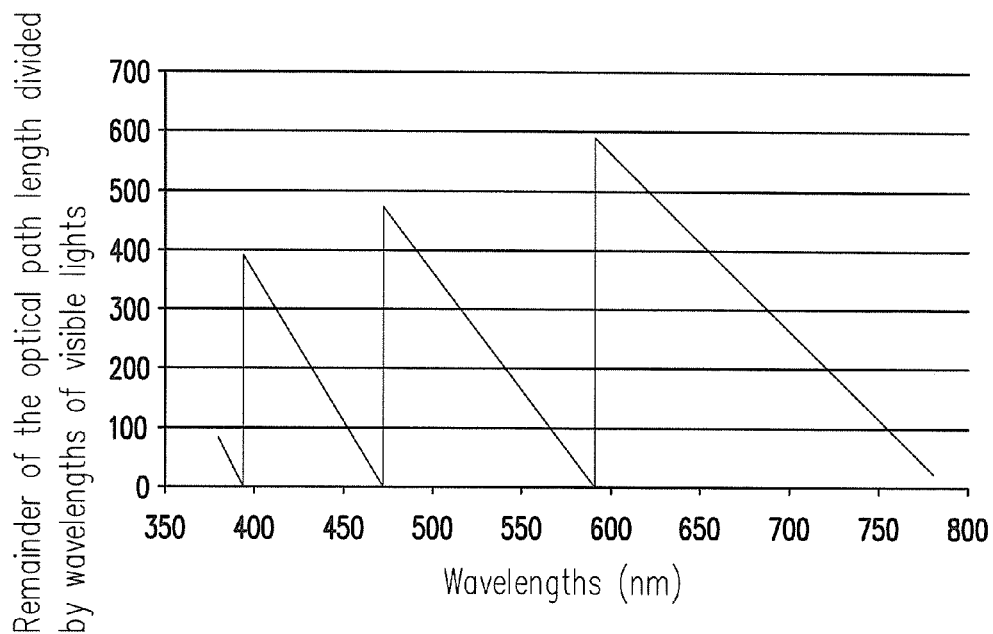
FIG. 1C is a distribution diagram of remainders obtained by dividing twice a total optical path length of an electrode layer and a passivation layer of FIG. 1A along a direction substantially parallel to a normal direction of a plastic substrate by wavelengths of visible lights.
Figure 1D:
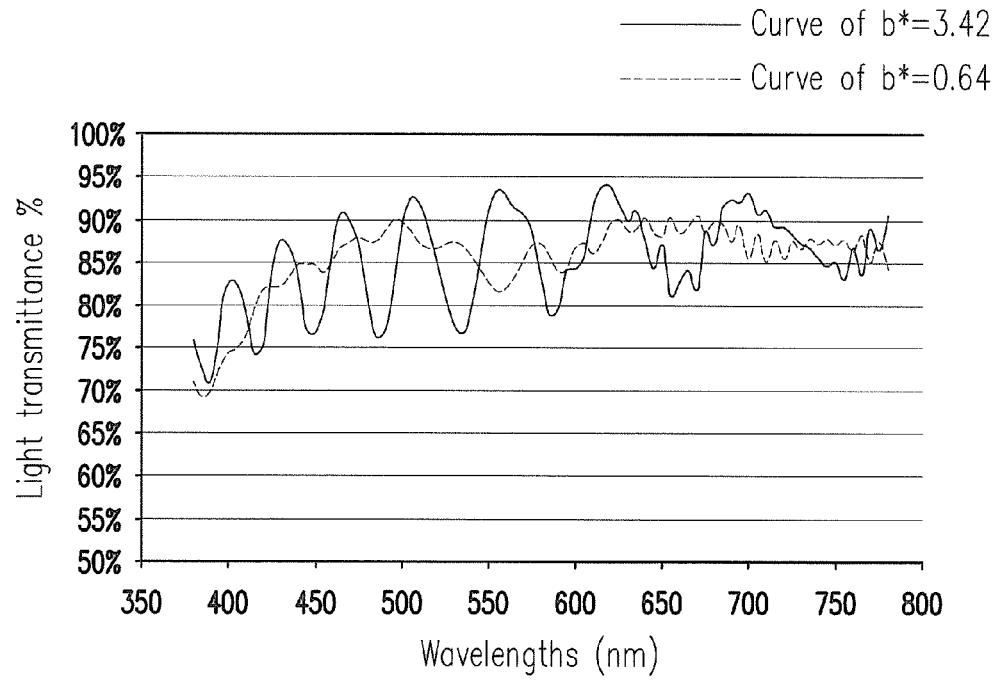
FIG. 1D is a transmittance diagram of the electrode layer and the passivation layer with two different total optical path lengths in a visible light range.

FIG. 1A is a cross-sectional view of a touch sensing structure according to an embodiment of the disclosure, FIG. 1B is a top view of an electrode layer, an insulation unit, first conductive connection segments and second conductive connection segments of the touch sensing structure of FIG. 1A, FIG. 1C is a distribution diagram of remainders obtained by dividing twice a total optical path length of an electrode layer and a passivation layer of FIG. 1A along a direction substantially parallel to a normal direction of a plastic substrate by wavelengths of visible lights, and FIG. 1D is a transmission spectrum diagram of the electrode layer and the passivation layer with two different total optical path lengths in a visible light range, where FIG. 1A is a cross-sectional view of FIG. 1B along an I-I line. Referring to FIG. 1A to FIG. 1D, the touch sensing structure 100 of the present embodiment includes a plastic substrate 110, a buffer layer 120, an electrode layer 130, an insulation unit 140, and a passivation layer 150. The buffer layer 120 is disposed on the plastic substrate 110. In the present embodiment, a material of the buffer layer 120 includes photoresist or inorganic material, and a material of the plastic substrate 110 includes polyethylene terephthalate (PET), polyethylene naphthalate resin (PEN), poly(cyclohexyldimethylene terephthalate (PCT), polyimide (PI), polyethersulfone (PES), polymethyl methacrylate (PMMA), polycarbonate (PC), a synthetic resin polymer material of acrylic acid or a combination thereof.

The electrode layer 130 includes a first patterned transparent electrode layer 131 and a second patterned transparent electrode layer 133. The first patterned transparent electrode layer 131 is disposed on the buffer layer 120, and the second patterned transparent electrode layer 133 is disposed on the buffer layer 120.

In the present embodiment, the first patterned transparent electrode layer 131 includes a plurality of first transparent electrode pads 132, and the second patterned transparent electrode layer 133 includes a plurality of second transparent electrode pads 134. Moreover, the touch sensing structure 100 may further include a plurality of first conductive connection segments 162 and a plurality of second conductive connection segments 172, where the first conductive connection segments 162 connect the first transparent electrode pads 132 in series to form multiple strings, and the second conductive connection segments 172 connect the second transparent electrode pads 134 in series to form multiple strings.

In the present embodiment, a material of the electrode layer (i.e. the material of the first patterned transparent electrode layer 131 and the second patterned transparent electrode layer 133) includes indium tin oxide (ITO), aluminum zinc oxide (AZO), zinc oxide (ZnO), gallium zinc oxide (GZO), $In_2O_3$, indium zinc oxide (IZO), titanium dioxide ($TiO_2$), fluorine-doped tin oxide ($SnO_2$:F, FTO), tin dioxide ($SnO_2$) or a combination thereof. In the present embodiment, a material of the first conductive connection segment 162 can be metal or the same as that of the first patterned transparent electrode layer 131, and a material of the second conductive connection segment 172 can be metal or the same as that of the second patterned transparent electrode layer 133.

The insulation unit 140 insulates the first patterned transparent electrode layer 131 and the second patterned transparent electrode layer 133. In the present embodiment, the first transparent electrode pads 132, the second transparent electrode pads 134 and the first conductive connection segments 162 are disposed on a same plane. The insulation unit 140 includes a plurality of insulation pads 142, and the insulation pads 142 are respectively disposed on the first conductive connection segments 162. The second conductive connection segments 172 respectively cross over the insulation pads 142, and each insulation pad 142 separates one of the first conductive connection segments 162 and one of the second conductive connection segments 172. In the present embodiment, a material of the insulation unit 140 (i.e. a material of the insulation pad 142) includes photoresist or inorganic material.

The passivation layer 150 is disposed on the electrode layer 130. In the present embodiment, a material of the passivation layer 150 includes photoresist or inorganic material. Twice the total optical path length of the electrode layer 130 and the passivation layer 150 along a direction substantially parallel to a normal direction N of the plastic substrate 110 ranges from 1000 nm to 2500 nm, e.g. from 1176 nm to 2364 nm. In the present embodiment, a thickness T1 of the electrode layer 130 ranges from 70 nm to 120 nm, where the thickness of the electrode layer 130 is a thickness of the first patterned transparent electrode layer 131, and the thickness of the electrode layer 130 is also a thickness of the second patterned transparent electrode layer 133. In the present embodiment, a thickness T2 of the passivation layer 150 ranges from 30 nm to 600 nm, e.g. from 350 nm to 600 nm. In the present embodiment, a refractive index of the electrode layer 130 ranges from 1.4 to 2.1, and a refractive index of the passivation layer 150 ranges from 1.4 to 2, e.g. from 1.4 to 1.55.

In the present embodiment, besides that the light transmitted from bottom to top (which is referred to as a first light hereinafter) sequentially passes through the plastic substrate 110, the buffer layer 120, the electrode layer 130 and the passivation layer 150, when a part of light (which is referred to as a second light hereinafter) is transmitted to an upper surface of the passivation layer 150, the second light is reflected by the upper surface and is transmitted downwards, and the second light is sequentially transmitted through the passivation layer 150 and the electrode layer 130, and is further reflected by a lower surface of the electrode layer 130, and then the second light is sequentially transmitted through the electrode layer 130 and the passivation layer 150 and finally passes through the upper surface of the passivation layer 150. When the second light and the first light are joined on the upper surface of the passivation layer 150, interference of the lights is produced, and the more the number of interference peaks on a transmission spectrum within a visible light range is, the greater the b*value in the CIE L*a*b* color space is, and the more yellow the color of the touch sensing structure 100 is.

In detail, the refractive index of the electrode layer 130 is, for example, n1, and the refractive index of the passivation layer 150 is, for example, n2, an optical path length (i.e. the aforementioned total optical path length) of the second light counted from the upper surface of the passivation layer 150 where the second light is reflected downwards to the upper surface of the passivation layer 150 where the second light is transmitted back is $2\times(n1\times T1+n2\times T2)$, which ranges from 1000 nm to 2500 nm, e.g. from 1176 nm to 2364 nm. In an embodiment, a distribution of remainders obtained by dividing twice the total optical path length by wavelengths of the visible lights is as that shown in FIG. 1C, where the remainder of 0 represents a wavelength that makes the first light and the second light to produce constructive interference, which may produce the interference peak in the transmission spectrum. When twice the total optical path length ranges from 1000 nm to 2500 nm, e.g. from 1176 nm to 2364 nm, the number of the interference peaks in the transmission spectrum of the light within the visible light range that penetrates through the electrode layer 130 and the passivation layer 150 is smaller than or equal to 5, e.g. smaller than or equal to 3, such that the b* value of the color of the light source within the visible light range that penetrates through the touch sensing structure 100 is smaller than or equal to 1, i.e. the color is not biased to yellow when viewed by human eyes. In this way, when the touch sensing structure 100 of the present embodiment is disposed on a display panel (the touch sensing structure 100 of the present embodiment is, for example, a touch panel), the touch sensing structure 100 is not liable to influence the color performance of an image displayed on the display panel. Moreover, based on the above method, the fabrication process of the touch sensing structure 100 is not limited to a low temperature fabrication process, and a high temperature fabrication process can be adopted to still obtain the touch sensing structure 100 with the color less biased to yellow.

As shown in FIG. 1D, the more the interference peaks of the transmission spectrum is (for example, the curve of $b^*=3.42$), the higher the $b^*$ value of the light color is (for example, 3.42), i.e., the more yellow the color is. Conversely, the less the interference peaks of the transmission spectrum is (for example, the curve of $b^*=0.64$, which has about 3 interference peaks), the lower the $b^*$ value of the light color is, i.e., the less the color is biased to yellow when viewed by human eyes. In other words, the more smooth the transmission spectrum is, the less the color biased to yellow, and in an embodiment, a curve of the transmission spectrum of the touch sensing structure 100 is the curve of $b^*=0.64$ shown in FIG. 1D. In an embodiment of the disclosure, the thickness T1 is 85 nm, the thickness T2 is 560 nm, and $b^*$ is 0.31. In another embodiment, the thickness T1 is 85 nm, the thickness T2 is 408 nm, and $b^*$ is 0.77. In still another embodiment, the thickness T1 is 85 nm, the thickness T2 is 570 nm, and $b^*$ is 0.52.

In the present embodiment, when the touch sensing structure 100 is fabricated, a de-bonding layer 60 can be first formed on a rigid substrate 50 (for example, a glass substrate), and then the touch sensing structure 100 is formed on the de-bonding layer 60. Since the plastic substrate 110 of the present embodiment is flexible, a process of fabricating the touch sensing structure 100 on the rigid substrate 50 is stable and easy. After fabrication of the touch sensing structure 100 is completed, the touch sensing structure 100 can be detached from the de-bonding layer 60, i.e. detached from the rigid substrate 50. In this way, the flexible touch sensing structure 100 is fabricated.

Moreover, in the present embodiment, the first patterned transparent electrode layer 131 of the touch sensing structure 100 can be electrically connected to an interpretation unit 300, and the second patterned transparent electrode layer 133 can be electrically connected to a signal generating unit 200, i.e. the second patterned transparent electrode layer 133 can serve as a driving electrode layer, and the first patterned transparent electrode layer 131 can serve as a sensing electrode layer to form a capacitive touch sensing device. However, in another embodiment, the first patterned transparent electrode layer 131 can also be electrically connected to the signal generating unit 200, and the second patterned transparent electrode layer 133 can be electrically connected to the an interpretation unit 300.

Figure 2:
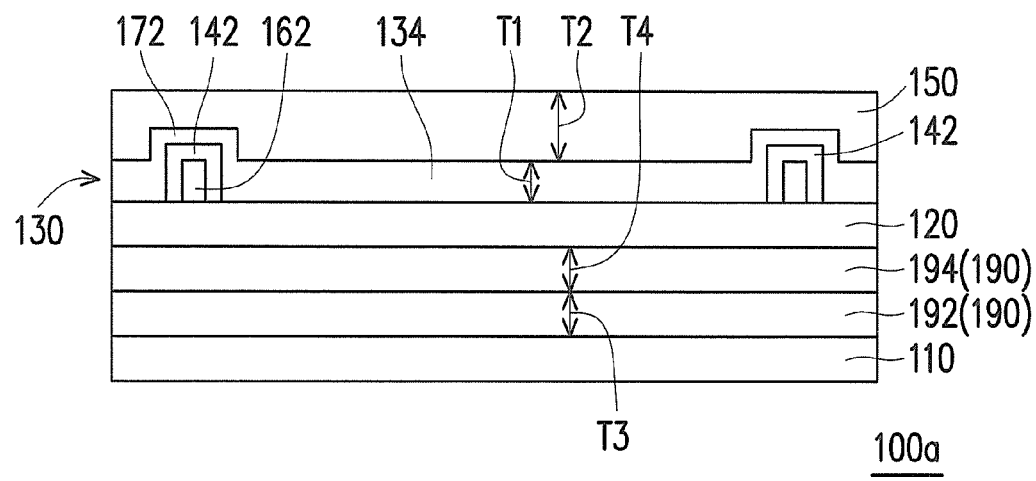
FIG. 2 is a cross-sectional view of a touch sensing structure according to another embodiment of the disclosure.

FIG. 2 is a cross-sectional view of a touch sensing structure according to another embodiment of the disclosure. Referring to FIG. 2, the touch sensing structure 100a of the present embodiment is similar to the touch sensing structure 100 of FIG. 1A, and a difference therebetween is as follows. The touch sensing structure 100a of the present embodiment further includes at least one functional layer 190 (two functional layers 190 are taken as an example in the present embodiment). The functional layers 190 are disposed on at least one of a first position and a second position, where the first position is located between the electrode layer 130 and the plastic substrate 110 (in the present embodiment, the first position is located between the buffer layer 120 and the plastic substrate 110), and the second position is located between the electrode layer 130 and the passivation layer 150, and in the present embodiment, the functional layers 190 are disposed at the first position. The functional layer 190 includes a functional barrier layer, a color filter layer, a buffer layer, a polarizer layer, a light-emitting layer, or any combination thereof, wherein the functional barrier layer is configured to block water or gas from passing therethrough, and the functional barrier layer includes a waterproof layer, a gas-blocking layer, or any combination thereof. In this embodiment, the functional layer 190 is, for example, the functional barrier layer. In addition, the light-emitting layer may include an active light-emitting element, a passive light-emitting element, or any combination thereof, for example, an organic light-emitting diode element, a liquid crystal display element, etc.

The functional layers 190 includes at least one silicon oxide layer 194, at least one silicon nitride layer 192, or any combination thereof. In the present embodiment, the silicon oxide layer 194 is, for example, disposed above the silicon nitride layer 192. Moreover, in the present embodiment, a thickness T4 of the silicon oxide layer 194 ranges from 20 nm to 250 nm, e.g. from 30 nm to 70 nm, and a thickness T3 of the silicon nitride layer 192 ranges from 20 nm to 250 nm, e.g. from 70 nm to 130 nm. In an embodiment, the thickness T1 of FIG. 2 is 70 nm, the thickness T2 is 401 nm, and a simulation value of $b^*$ is $-0.73$. In another embodiment, the thickness T1 of FIG. 2 is 85 nm, the thickness T2 is 398 nm, and the simulation value of $b^*$ is $-0.68$. In still another embodiment, the thickness T1 of FIG. 2 is 115 nm, the thickness T2 is 380 nm, and the simulation value of $b^*$ is $-0.38$. When the display panel is disposed under the touch sensing structure 100a, the functional layer can block water (including vapor) and gas to maintain reliability of the display panel, so as to prolong a service life of the display panel.

Figure 3:
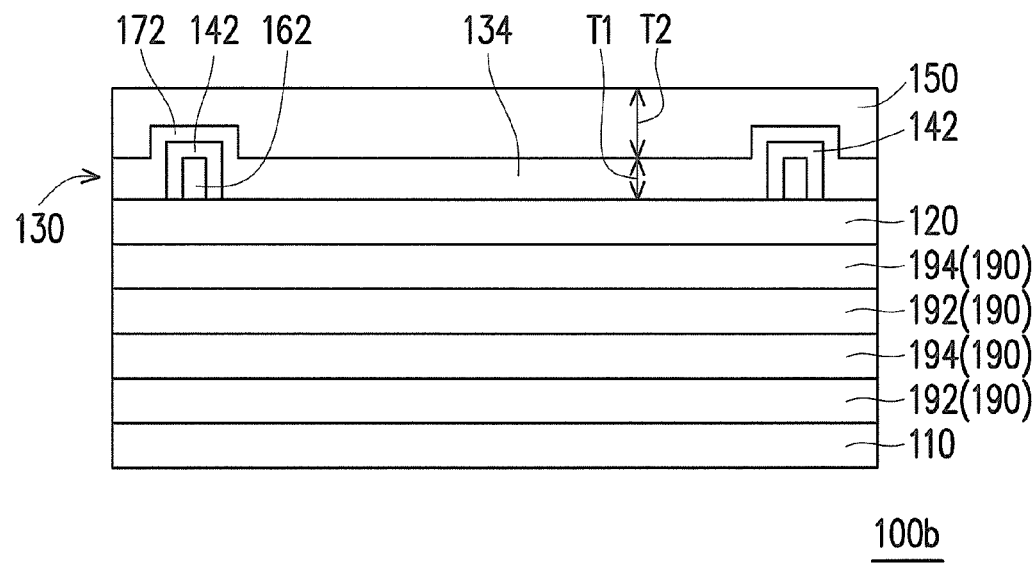
FIG. 3 is a cross-sectional view of a touch sensing structure according to still another embodiment of the disclosure.

FIG. 3 is a cross-sectional view of a touch sensing structure according to still another embodiment of the disclosure. Referring to FIG. 3, the touch sensing structure 100b of the present embodiment is similar to the touch sensing structure 100a of FIG. 1A, and a difference therebetween is as follows. The touch sensing structure 100b of the present embodiment includes two silicon nitride layers 192 and two silicon oxide layers 194 arranged in alternation. In an embodiment, the thickness T1 of FIG. 3 is 70 nm, the thickness T2 is 401 nm, and a simulation value of $b^*$ is $-0.72$. In another embodiment, the thickness T1 of FIG. 3 is 85 nm, the thickness T2 is 398 nm, and the simulation value of $b^*$ is $-0.67$. In still another embodiment, the thickness T1 of FIG. 3 is 115 nm, the thickness T2 is 375 nm, and the simulation value of $b^*$ is $-0.57$.

Figure 4:
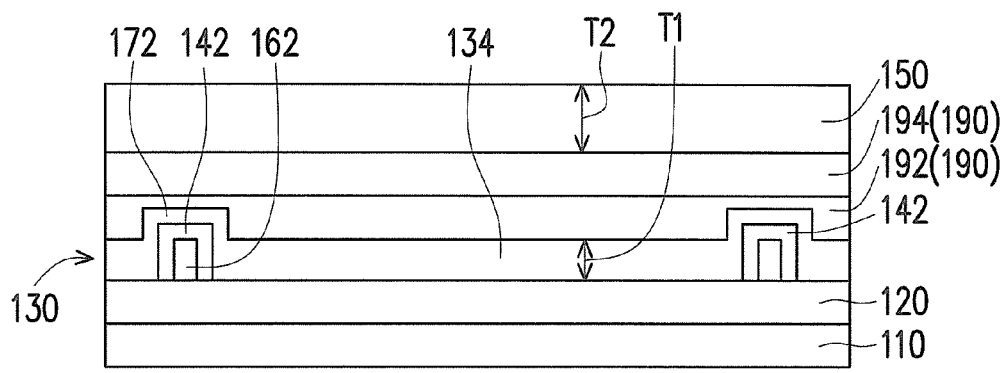
FIG. 4 is a cross-sectional view of a touch sensing structure according to yet another embodiment of the disclosure.

FIG. 4 is a cross-sectional view of a touch sensing structure according to yet another embodiment of the disclosure. Referring to FIG. 4, the touch sensing structure 100c of the present embodiment is similar to the touch sensing structure 100a of FIG. 2, and a difference therebetween is that in the touch sensing structure 100c, the functional layer 190 (including the silicon nitride layer 192 and the silicon oxide layer 194) is disposed between the electrode layer 130 and the passivation layer 150 (i.e. the aforementioned second position). In an embodiment, the thickness T1 of FIG. 4 is 70 nm, the thickness T2 is 380 nm, and a simulation value of $b^*$ is 0.56. In another embodiment, the thickness T1 of FIG. 4 is 85 nm, the thickness T2 is 405 nm, and the simulation value of $b^*$ is 0.47. In still another embodiment, the thickness T1 of FIG. 4 is 115 nm, the thickness T2 is 395 nm, and the simulation value of $b^*$ is 0.58.

Figure 5:
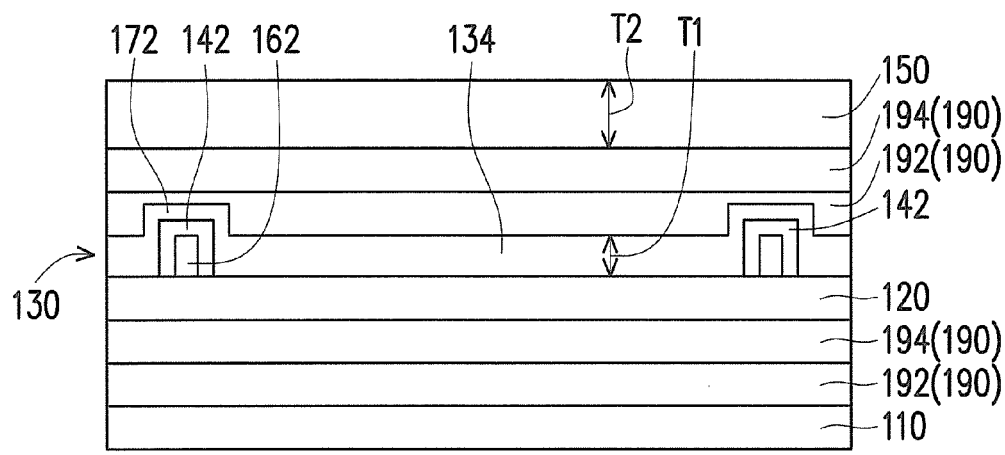
FIG. 5 is a cross-sectional view of a touch sensing structure according to still another embodiment of the disclosure.

FIG. 5 is a cross-sectional view of a touch sensing structure according to still another embodiment of the disclosure. Referring to FIG. 5, the touch sensing structure 100d of the present embodiment is similar to the touch sensing structure 100a of FIG. 2, and a difference therebetween is that in the touch sensing structure 100d, there are the silicon oxide layer 194 and the silicon nitride layer 192 at the first position, and there are also the silicon oxide layer 194 and the silicon nitride layer 192 at the second position. In an embodiment, the thickness T1 of FIG. 5 is 70 nm, the thickness T2 is 380 nm, and a simulation value of b* is 0.58. In another embodiment, the thickness T1 of FIG. 5 is 85 nm, the thickness T2 is 400 nm, and the simulation value of b* is 0.18. In still another embodiment, the thickness T1 of FIG. 5 is 115 nm, the thickness T2 is 395 nm, and the simulation value of b* is 0.6.

Figure 6:
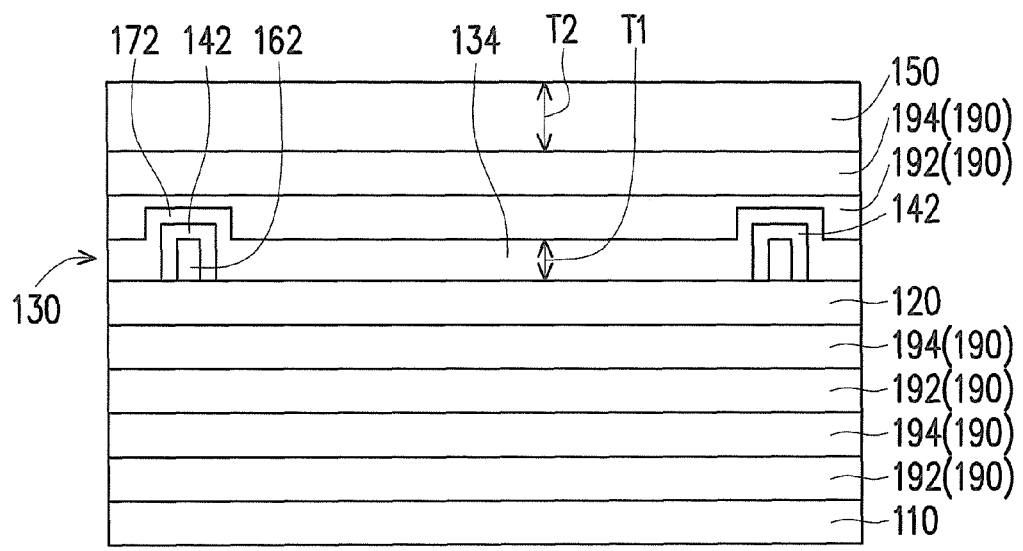
FIG. 6 is a cross-sectional view of a touch sensing structure according to still another embodiment of the disclosure.

FIG. 6 is a cross-sectional view of a touch sensing structure according to still another embodiment of the disclosure. Referring to FIG. 6, the touch sensing structure 100e of the present embodiment is similar to the touch sensing structure 100d of FIG. 5, and a difference therebetween is that in the touch sensing structure 100e, there are two silicon oxide layers 194 and two silicon nitride layers 192 stacked in alternation at the first position. In an embodiment, the thickness T1 of FIG. 6 is 70 nm, the thickness T2 is 380 nm, and a simulation value of b* is −0.6. In another embodiment, the thickness T1 of FIG. 6 is 85 nm, the thickness T2 is 405 nm, and the simulation value of b* is 0.5. In still another embodiment, the thickness T1 of FIG. 6 is 115 nm, the thickness T2 is 395 nm, and the simulation value of b* is 0.61.

Figure 7A:
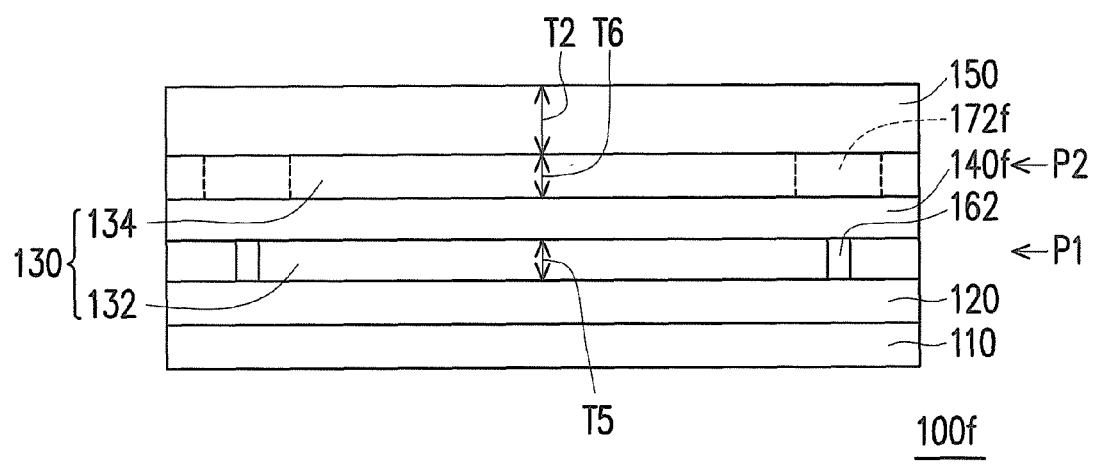
FIG. 7A is a cross-sectional view of a touch sensing structure according to still another embodiment of the disclosure.
Figure 7B:
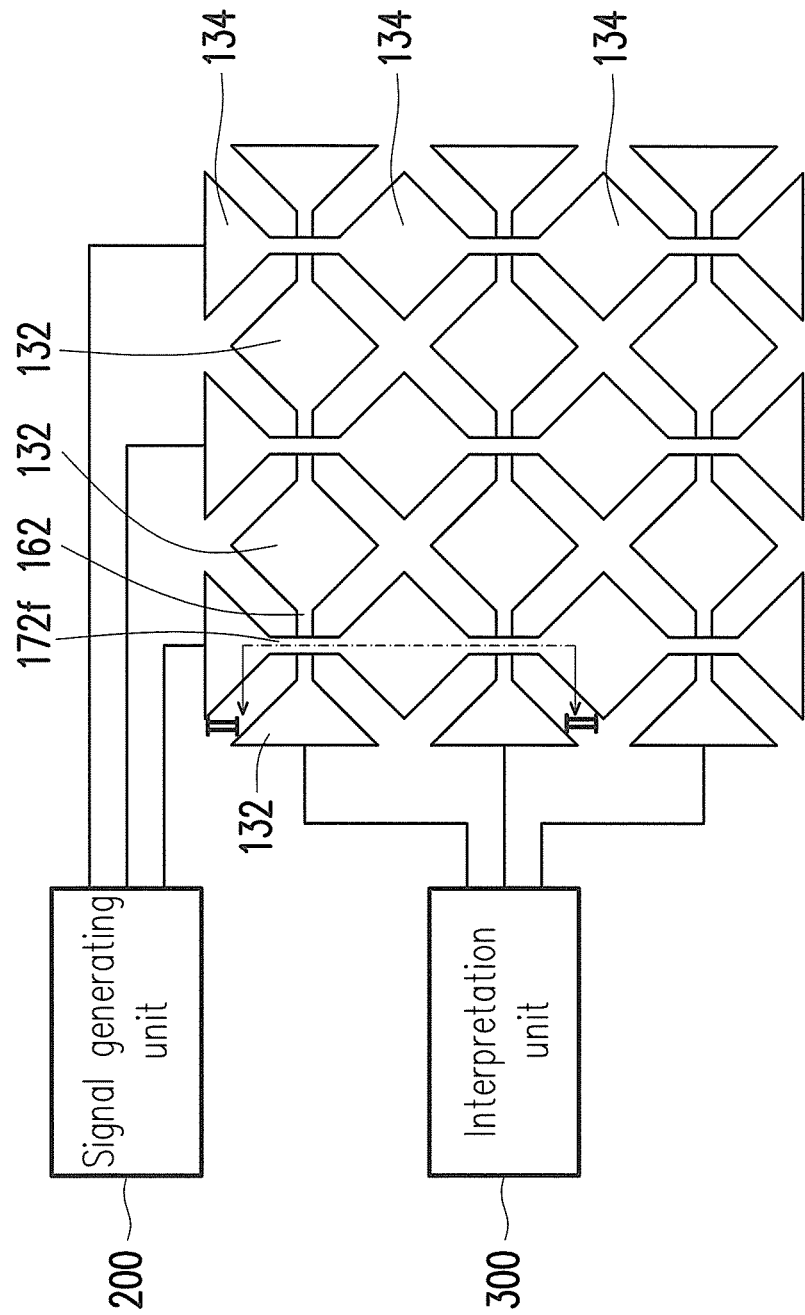
FIG. 7B is a top view of an electrode layer, first conductive connection segments and second conductive connection segments of the touch sensing structure of FIG. 7A.

FIG. 7A is a cross-sectional view of a touch sensing structure according to still another embodiment of the disclosure. FIG. 7B is a top view of an electrode layer, first conductive connection segments and second conductive connection segments of the touch sensing structure of FIG. 7A, where FIG. 7A is a cross-sectional view of FIG. 7B along a II-II line. Referring to FIG. 7A and FIG. 7B, the touch sensing structure 100f of the present embodiment is similar to the touch sensing structure 100 of FIG. 1A and FIG. 1B, and a main difference therebetween is as follows. In the touch sensing structure 100f of the present embodiment, the first transparent electrode pads 132 and the first conductive connection segments 162 are disposed on a same first plane P1, and the second transparent electrode pads 134 and the second conductive connection segments 172f are disposed on a same second plane P2, where the first plane P1 and the second plane P2 is space by a distance. Moreover, an insulation unit 140f is an insulation layer, which is disposed between the first plane P1 and the second plane P2.

In the present embodiment, the thickness T5 of the first patterned transparent electrode layer 131 ranges from 70 nm to 120 nm, and the thickness T6 of the second patterned transparent electrode layer 133 ranges from 70 nm to 120 nm.

In summary, in the touch sensing structure of the disclosure, since twice the total optical path length of the electrode layer and the passivation layer along a direction substantially parallel to a normal direction of the plastic substrate ranges from 1000 nm to 2500 nm, e.g. from 1176 nm to 2364 nm, the b* value of the color of the touch sensing structure in the CIE L*a*b* color space is relatively small, such that the yellowing phenomenon of the touch sensing structure can be effectively mitigated.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A touch sensing structure, comprising:
   a plastic substrate;
   a buffer layer, disposed on the plastic substrate;
   an electrode layer, comprising:
      a first patterned transparent electrode layer, disposed on the buffer layer; and
      a second patterned transparent electrode layer, disposed on the buffer layer;
   an insulation unit, insulating the first patterned transparent electrode layer and the second patterned transparent electrode layer; and
   a passivation layer, disposed on the electrode layer, wherein twice a total optical path length of the electrode layer and the passivation layer along a direction substantially parallel to a normal direction of the plastic substrate ranges from 1000 nm to 2500 nm.

2. The touch sensing structure as claimed in claim 1, wherein a number of interference peaks in a transmission spectrum of a light within a visible light range that penetrates through the electrode layer and the passivation layer is smaller than or equal to 5.

3. The touch sensing structure as claimed in claim 1, further comprising at least one functional layer disposed on at least one of a first position and a second position, wherein the first position is located between the electrode layer and the plastic substrate, the second position is located between the electrode layer and the passivation layer, and the functional layer comprises a functional barrier layer, a color filter layer, another buffer layer, a polarizer layer, a light-emitting layer, or a combination thereof, wherein the functional barrier layer is configured to block water or gas from passing therethrough, and the functional barrier layer comprises a waterproof layer, a gas-blocking layer, or a combination thereof.

4. The touch sensing structure as claimed in claim 3, wherein the at least one functional layer comprises at least one silicon oxide layer, at least one silicon nitride layer, or a combination thereof.

5. The touch sensing structure as claimed in claim 4, wherein a thickness of the silicon oxide layer ranges from 20 nm to 250 nm, and a thickness of the silicon nitride layer ranges from 20 nm to 250 nm.

6. The touch sensing structure as claimed in claim 1, wherein a material of the plastic substrate comprises polyethylene terephthalate (PET), polyethylene naphthalate resin (PEN), poly(cyclohexyldimethylene terephthalate (PCT), polyimide (PI), polyethersulfone (PES), polymethyl methacrylate (PMMA), polycarbonate (PC), a synthetic resin polymer material of acrylic acid or a combination thereof.

7. The touch sensing structure as claimed in claim 1, wherein a material of the buffer layer comprises photoresist or inorganic material.

8. The touch sensing structure as claimed in claim 1, wherein a material of the electrode layer comprises indium tin oxide (ITO), aluminum zinc oxide (AZO), zinc oxide (ZnO), gallium zinc oxide (GZO), $In_2O_3$, indium zinc oxide (IZO), titanium dioxide ($TiO_2$), fluorine-doped tin oxide ($SnO_2$:F, FTO), tin dioxide ($SnO_2$) or a combination thereof.

9. The touch sensing structure as claimed in claim 1, wherein a material of the passivation layer comprises photoresist or inorganic material.

10. The touch sensing structure as claimed in claim 1, wherein a material of the insulation unit comprises photoresist or inorganic material.

11. The touch sensing structure as claimed in claim 1, wherein a thickness of the electrode layer ranges from 70 nm to 120 nm.

12. The touch sensing structure as claimed in claim 1, wherein a thickness of the first patterned transparent electrode layer ranges from 70 nm to 120 nm, and a thickness of the second patterned transparent electrode layer ranges from 70 nm to 120 nm.

13. The touch sensing structure as claimed in claim 1, wherein a refractive index of the electrode layer ranges from 1.4 to 2.1.

14. The touch sensing structure as claimed in claim 1, wherein a thickness of the passivation layer ranges from 30 nm to 600 nm.

15. The touch sensing structure as claimed in claim 1, wherein a refractive index of the passivation layer ranges from 1.4 to 2.

16. The touch sensing structure as claimed in claim 1, wherein the first patterned transparent electrode layer comprises a plurality of first transparent electrode pads, the second patterned transparent electrode layer comprises a plurality of second transparent electrode pads, the touch sensing structure further comprises a plurality of first conductive connection segments and a plurality of second conductive connection segments, the first conductive connection segments connect the first transparent electrode pads in series to form a plurality of strings, and the second conductive connection segments connect the second transparent electrode pads in series to form a plurality of strings.

17. The touch sensing structure as claimed in claim 16, wherein the first transparent electrode pads, the second transparent electrode pads and the first conductive connection segments are disposed on a same plane, the insulation unit comprises a plurality of insulation pads, and the insulation pads are respectively disposed on the first conductive connection segments, the second conductive connection segments respectively cross over the insulation pads, and each insulation pad separates one of the first conductive connection segments and one of the second conductive connection segments.

18. The touch sensing structure as claimed in claim 16, wherein the first transparent electrode pads and the first conductive connection segments are disposed on a same first plane, and the second transparent electrode pads and the second conductive connection segments are disposed on a same second plane, wherein the first plane and the second plane are spaced by a distance, and the insulation unit is an insulation layer disposed between the first plane and the second plane.

* * * * *